(12) United States Patent
Zhang et al.

(10) Patent No.: US 12,454,477 B2
(45) Date of Patent: Oct. 28, 2025

(54) METHOD AND SYSTEM FOR ENHANCED CULTURE OF AEROBIC GRANULAR SLUDGE

(71) Applicant: BEIJING DRAINAGE GROUP CO., LTD, Beijing (CN)

(72) Inventors: Shujun Zhang, Beijing (CN); Yongqing Gao, Beijing (CN); Lixin Sun, Beijing (CN); Yong Jiang, Beijing (CN); Yu Bai, Beijing (CN); Fangbo Bao, Beijing (CN); Xueying Su, Beijing (CN); Yao Liu, Beijing (CN); Wei Fu, Beijing (CN); Tong Li, Beijing (CN)

(73) Assignee: BEIJING DRAINAGE GROUP CO., LTD, Beijing (CN)

( * ) Notice: Subject to any disclaimer, the term of this patent is extended or adjusted under 35 U.S.C. 154(b) by 401 days.

(21) Appl. No.: 18/005,884

(22) PCT Filed: Nov. 25, 2021

(86) PCT No.: PCT/CN2021/133135
§ 371 (c)(1),
(2) Date: Jan. 18, 2023

(87) PCT Pub. No.: WO2022/213619
PCT Pub. Date: Oct. 13, 2022

(65) Prior Publication Data
US 2023/0271863 A1 Aug. 31, 2023

(30) Foreign Application Priority Data
Apr. 8, 2021 (CN) .......................... 202110379514.2

(51) Int. Cl.
*C02F 3/12* (2023.01)
*C02F 3/00* (2023.01)

(52) U.S. Cl.
CPC ...... *C02F 3/1236* (2013.01); *C02F 2003/001* (2013.01); *C02F 2203/006* (2013.01)

(58) Field of Classification Search
CPC .............. C02F 3/1236; C02F 2003/001; C02F 2203/006; C02F 2203/004; C02F 3/12;
(Continued)

(56) References Cited

FOREIGN PATENT DOCUMENTS

| CN | 101555068 A | 10/2009 |
|---|---|---|
| CN | 106854012 A | 6/2017 |

(Continued)

OTHER PUBLICATIONS

Translation of Chen (CN111606414A) (Year: 2020).*

*Primary Examiner* — Ekandra S. Miller-Cruz
(74) *Attorney, Agent, or Firm* — FISHERBROYLES, LLP; Roger L. Browdy; Ronni S. Jillions

(57) ABSTRACT

The present disclosure belongs to the technical field of sewage treatment, and discloses a method and system for enhanced culture of aerobic granular sludge. The system includes a reaction tank, a water inlet and outlet unit, an aeration unit, and a sludge discharge unit. The water inlet and outlet unit includes a water inlet pump, a water inlet electric valve, a liquid flowmeter, a sewage uniform distribution treatment device, buffers, a water drainage pipe, and a water drainage electric valve. The aeration unit includes a blower, microporous aerators, and a gas flowmeter. The sludge discharge unit includes sludge discharge pumps, a sludge discharge pipe, a sludge discharge electric valve, and a sludge concentration meter. In the present disclosure, a multi-point uniform water distribution method is used. When the flow rate of influent water is adjusted, sewage slowly and uniformly flows through a sludge layer from the bottom of the system, so that the concentration of organic matter in raw water is prevented from being rapidly reduced (Continued)

by rapid single-point water intake, the utilization rate of the organic matter in the sewage is increased to the maximum extent, and the efficiency of the system is improved.

10 Claims, 1 Drawing Sheet

(58) Field of Classification Search
CPC .... C02F 2209/40; C02F 3/1263; Y02W 10/10
USPC .......................................................... 210/623
See application file for complete search history.

(56) References Cited

FOREIGN PATENT DOCUMENTS

| | | |
|---|---|---|
| CN | 109293159 A | 2/2019 |
| CN | 209128135 U | 7/2019 |
| CN | 110330099 A | 10/2019 |
| CN | 111606414 A | 9/2020 |
| WO | 2020205834 A | 10/2020 |

* cited by examiner

METHOD AND SYSTEM FOR ENHANCED CULTURE OF AEROBIC GRANULAR SLUDGE

FIELD OF TECHNOLOGY

The present disclosure belongs to the technical field of sewage treatment, and specifically relates to a method and system for enhanced culture of aerobic granular sludge.

BACKGROUND

As a special biofilm formed by self-coagulation of microorganisms, aerobic granular sludge has both characteristics of an ordinary biofilm and the advantages of low investment and no additional cancer. Meanwhile, compared with ordinary activated sludge, the aerobic granular sludge has the advantages of high sedimentation rate, less occupied area, high biomass, strong impact resistance, little residual sludge, synchronous denitrification and phosphorus removal, and low energy and drug consumption, thus having great application advantages.

The research on an aerobic granular sludge technology was started in the 1990s. In 1991, the aerobic granular sludge was found by foreign researchers in continuous operation of an aerobic upflow sludge bed reactor for the first time. In 1997, the aerobic granular sludge was successfully cultured in an SBR by researchers based on the culture experience of anaerobic granular sludge in an SBR, so that a foundation was laid for culturing the aerobic granular sludge in an SBR reactor. In China, the aerobic granular sludge technology was started in 1999, and has a theoretical basis of nearly 20 years. At present, the aerobic granular sludge has been successfully cultured by using different kinds of wastewater, such as synthetic wastewater, municipal sewage, and industrial wastewater, at home and abroad. Internationally, engineering application cases of the aerobic granular sludge have been achieved, and the application scale is gradually expanded from the initial several hundred cubic meters per day to more than 100,000 cubic meters per day. The fields of industrial wastewater and municipal sewage are involved in application. However, the research in China is in a transition stage from a laboratory to engineering application.

The key to the application of the aerobic granular sludge technology includes rapid culture and stable maintenance of the granular sludge. At present, the most important parameters of culturing the aerobic granular sludge include: slowly growing microorganisms as the core, high organic load, selection pressure formed after rapid sedimentation, and strong aeration shear force. The granular sludge cultured by using a feast-hunger strategy with the slowly growing microorganisms as the core has higher stability. According to the research in China, the granular sludge is usually cultured by a rapid water intake method, and the aerobic granular sludge cultured is easy to disintegrate. In addition, since the municipal sewage in China generally has low organic load, after single-point water intake is conducted, raw water is immediately diluted after entering a wastewater treatment structure. The organic load is low, and the culture of the aerobic granular sludge and the effects of biological phosphorous removal and denitrification are not facilitated. Therefore, it is necessary to invent a method capable of combining the important parameters of culturing the aerobic granular sludge to rapidly culture the aerobic granular sludge and improve the stability of the aerobic granular sludge and the operation efficiency of the system.

SUMMARY

In view of the defects of the prior art, the present disclosure provides a method and system for enhanced culture of aerobic granular sludge. The culture time of the aerobic granular sludge can be shortened, the stability of the aerobic granular sludge is improved, more economic benefits are achieved, and the method and the system are more suitable for engineering application.

In order to achieve the above objective, on the one hand, the present disclosure provides a system for enhanced culture of aerobic granular sludge. The system includes a reaction tank, a water inlet and outlet unit, an aeration unit, and a sludge discharge unit.

The water inlet and outlet unit comprises a water inlet pump, a water inlet electric valve, a liquid flowmeter, a sewage uniform distribution treatment device, buffers, a water drainage pipe, and a water drainage electric valve; the water inlet pump, the water inlet electric valve, the liquid flowmeter, and the sewage uniform distribution treatment device are connected in sequence; the sewage uniform distribution treatment device is arranged in the reaction tank, and used for realizing water intake and water drainage of the system; there are a plurality of buffers, and the plurality of buffers are arranged at the bottom of the reaction tank, and used for buffering the water intake of the sewage uniform distribution treatment device.

The aeration unit includes a blower, microporous aerators, and a gas flowmeter. There are a plurality of microporous aerators, and the plurality of microporous aerators are arranged at the bottom of the reaction tank, the blower is connected to the plurality of microporous aerators through a pipeline, and the gas flowmeter is installed on the pipeline.

The sludge discharge unit includes sludge discharge pumps, a sludge discharge pipe, a sludge discharge electric valve, and a sludge concentration meter. There are a plurality of sludge discharge pumps, and the plurality of sludge discharge pumps are arranged in the reaction tank, and connected to the sludge discharge pipe. The sludge discharge electric valve and the sludge concentration meter are arranged on the sludge discharge pipe.

On the other hand, the present disclosure provides a method for enhanced culture of aerobic granular sludge. The method uses the system, and includes the following steps:
- S1: subjecting sewage to grating treatment, aerated sand setting treatment, and treatment in a primary sedimentation tank in sequence; and
- S2: inoculating seed sludge to the system, conveying effluent from the primary sedimentation tank to the system, and allowing periodic operation of the system, where the periodic operation includes a process 1 involving water intake (water drainage), stirring, sedimentation, sludge discharge, aeration, and standing, a process 2 involving water intake, aeration, sedimentation, and water drainage, or a process 3 involving water intake, stirring, aeration, sedimentation, and water drainage;
  in the process 1, the water intake stage and the water drainage stage are carried out simultaneously;
  in the process 2, the water intake stage and the water drainage stage are carried out separately; and in the process 3, the water intake stage and the stirring stage are carried out simultaneously or separately, and the water intake stage and the water drainage stage are carried out separately.

The technical solutions of the present disclosure have the following beneficial effects.

(1) In the present disclosure, a multi-point uniform water distribution method is used. When the flow rate of influent water is adjusted, sewage slowly and uniformly flows through a sludge layer from the bottom of the system, so that microorganisms in the sludge at the bottom are first in contact with high-concentration organic matter in the influent water and then use the organic matter, and the concentration of organic matter in raw water is prevented from being rapidly reduced by rapid single-point water intake. When the water intake is conducted slowly at the bottom, the utilization rate of the organic matter in the sewage can be increased to the maximum extent, and the efficiency of the system is improved.

(2) In the present disclosure, stable granular sludge with the functions of denitrification and phosphorus removal can be obtained by using a feast-hunger strategy.

(3) In the present disclosure, uniform water intake and water drainage can be conducted at the same time to combine the time for the water intake and the time for the water drainage into one during operation. The saved operation time can be used for a biological reaction, so that the treatment load is increased.

Other features and advantages of the present disclosure are described in detail below in the description of the embodiments.

BRIEF DESCRIPTION OF THE DRAWINGS

The above objective, other objectives, features, and advantages of the present disclosure will become more apparent by the description of the exemplary embodiments of the present disclosure in more detail in conjunction with accompanying drawings. In the exemplary embodiments of the present disclosure, same reference callouts usually refer to same parts.

Figure 3:
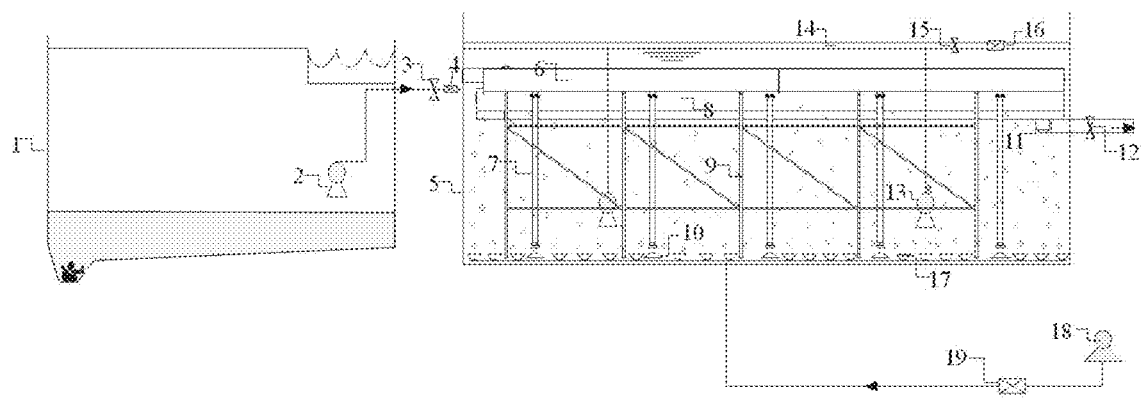
FIG. 3 is a structural schematic diagram of a system for enhanced culture of aerobic granular sludge provided in Example 1 of the present disclosure.

In the above FIG. 3, various figure callouts have the following specific meanings:

1, primary sedimentation tank; 2, water inlet pump; 3, water inlet electric valve; 4, liquid flowmeter; 5, reaction tank; 6, water inlet device; 7, vertical water inlet branch pipe; 8, water outlet device; 9, fixing support; 10, buffer; 11, water drainage pipe; 12, water drainage electric valve; 13, sludge discharge pump; 14, sludge discharge pipe; 15, sludge discharge electric valve; 16, sludge concentration meter; 17, microporous aerator; 18, blower; and 19, gas flowmeter.

DESCRIPTION OF THE EMBODIMENTS

The preferred embodiments of the present disclosure are described in more detail below. Although the preferred embodiments of the present disclosure are described below, it should be understood that the present disclosure can be realized in various forms, and should not be limited to the embodiments described herein. On the contrary, the embodiments are proposed to make the present disclosure more thorough and complete, and to make the scope of the present disclosure completely understood by persons skilled in the art.

On the one hand, the present disclosure provides a system for enhanced culture of aerobic granular sludge. The system includes a reaction tank, a water inlet and outlet unit, an aeration unit, and a sludge discharge unit.

The water inlet and outlet unit includes a water inlet pump, a water inlet electric valve, a liquid flowmeter, a sewage uniform distribution treatment device, buffers, a water drainage pipe, and a water drainage electric valve. The water inlet pump, the water inlet electric valve, the liquid flowmeter, and the sewage uniform distribution treatment device are connected in sequence. The sewage uniform distribution treatment device is arranged in the reaction tank, and used for realizing water intake and water drainage of the system. There are a plurality of buffers, and the plurality of buffers are arranged at the bottom of the reaction tank, and used for buffering the water intake of the sewage uniform distribution treatment device.

The aeration unit includes a blower, microporous aerators, and a gas flowmeter. There are a plurality of microporous aerators, and the plurality of microporous aerators are arranged at the bottom of the reaction tank, the blower is connected to the plurality of microporous aerators through a pipeline, and the gas flowmeter is installed on the pipeline.

The sludge discharge unit includes sludge discharge pumps, a sludge discharge pipe, a sludge discharge electric valve, and a sludge concentration meter. There are a plurality of sludge discharge pumps, and the plurality of sludge discharge pumps are arranged in the reaction tank, and connected to the sludge discharge pipe. The sludge discharge electric valve and the sludge concentration meter are arranged on the sludge discharge pipe.

In the present disclosure, the gas flowmeter is used for monitoring the aeration flow rate of the blower.

According to the present disclosure, preferably, the sewage uniform distribution treatment device is installed in the reaction tank through a fixing support. Horn openings connected to the lower ends of a plurality of vertical water inlet branch pipes of the sewage uniform distribution treatment device are arranged close to the bottom of the reaction tank, and correspond to the plurality of buffers one by one.

According to the present disclosure, preferably, the sewage uniform distribution treatment device is a pressure flow sewage uniform distribution treatment device or a gravity flow sewage uniform distribution treatment device.

In the present disclosure, as a preferred solution, the sewage distribution treatment device includes a water inlet device and a water outlet device. The water inlet device includes a water inlet main pipe, a water inlet inner channel, a water inlet weir, a water inlet outer channel, a plurality of vertical water inlet branch pipes, and a plurality of horn openings. The water outlet device includes a water outlet main pipe, a water outlet channel, a water outlet weir, an outer flow baffle plate, and an inner flow baffle plate. Lower end openings of the plurality of vertical water inlet branch pipes are connected to the plurality of horn openings. The water inlet device is connected to the liquid flowmeter. The water outlet device is connected to the water drainage pipe.

In the present disclosure, connection forms of various component structures of the pressure flow sewage uniform distribution treatment device are described in detail with reference to the following patent with a patent number of CN201821823053.3: PRESSURE FLOW SEWAGE UNIFORM DISTRIBUTION TREATMENT DEVICE FOR AEROBIC GRANULAR SLUDGE SYSTEM. Connection forms of various component structures of the gravity flow sewage uniform distribution treatment device are described in detail with reference to the following patent with a patent number of CN201821822434.X: SEWAGE UNIFORM DISTRIBUTION TREATMENT DEVICE FOR AEROBIC GRANULAR SLUDGE SYSTEM.

On the other hand, the present disclosure provides a method for enhanced culture of aerobic granular sludge. The method uses the system, and includes the following steps:

S1: subjecting sewage to grating treatment, aerated sand setting treatment, and treatment in a primary sedimentation tank in sequence; and S2: inoculating seed sludge to the system, conveying effluent from the primary sedimentation tank to the system, and allowing periodic operation of the system, where the periodic operation includes a process 1 involving water intake (water drainage), stirring, sedimentation, sludge discharge, aeration, and standing, a process 2 involving water intake, aeration, sedimentation, and water drainage, or a process 3 involving water intake, stirring, aeration, sedimentation, and water drainage;

in the process 1, the water intake stage and the water drainage stage are carried out simultaneously;

in the process 2, the water intake stage and the water drainage stage are carried out separately; and in the process 3, the water intake stage and the stirring stage are carried out simultaneously or separately, and the water intake stage and the water drainage stage are carried out separately.

In the present disclosure, "the water intake (water drainage)" in the process 1 indicates that the water intake stage and the water drainage stage in the process 1 are carried out simultaneously.

In the present disclosure, each time when the process 1, process 2, or process 3 is completed by the system, an operation period is completed. After one period is completed, the next period is entered. The number of operation periods per day is determined according to the daily treatment load. As a preferred solution, successful culture indicates that the aerobic granular sludge with a particle size of greater than 220 µm accounts for 50%-100% of the total aerobic granular sludge cultured by the system.

According to the present disclosure, preferably, the seed sludge is ordinary floc sludge or sludge cake, and has an average particle size of 40-100 µm and a sludge concentration of 2,000-8,000 mg/L.

According to the present disclosure, preferably, the sewage has a COD of 100-2,000 mg/L, an ammonia nitrogen content of 20-200 mg/L, a total nitrogen content of 20-200 mg/L, and a total phosphorus content of 1-20 mg/L.

According to the present disclosure, preferably,
in the process 1, the water intake and the water drainage are both conducted for 30-120 minutes, the stirring is conducted for 10-90 minutes, the sedimentation is conducted for 10-120 minutes, the sludge discharge is conducted for 3-30 minutes, and the aeration is conducted for 60-360 minutes;
in the process 2, the water intake is conducted for 30-120 minutes, the aeration is conducted for 60-360 minutes, the sedimentation is conducted for 20-200 minutes, and the water drainage is conducted for 10-40 minutes, and
in the process 3, the water intake is conducted for 30-120 minutes, the stirring is conducted for 30-60 minutes, the aeration is conducted for 30-360 minutes, the sedimentation is conducted for 20-140 minutes, and the water drainage is conducted for 10-40 minutes.

In the present disclosure, in the standing stage of the process 1, sludge and water are separated, and the sludge is settled to form an obvious sludge bed. The standing time is obtained by subtracting the time for other processes from the period time.

According to the present disclosure, preferably, in the process 1, process 2, and process 3, the water exchange ratio is 20%-70%.

In the present invention, as a pre-selected solution, the internal upflow rate can be controlled at 1-20 m/h by constantly adjusting the flow rate of influent water to avoid the situation that effluent and adsorption of microorganisms are affected by severe disturbance of a sludge layer due to a too high upflow rate. The sludge layer is first in full contact with organic matter in the influent water, and the organic matter in the influent water is converted into intracellular matter with slow degradation rate by the microorganisms.

According to the present disclosure, preferably, in the process 1, a method for carrying out the water intake stage and the water drainage stage simultaneously is as follows: when water intake is conducted in a current period, effluent obtained after treatment in the last period is discharged.

In the present disclosure, in the water intake stage of the process 1, effluent from the primary sedimentation tank is conveyed to the system from the bottom through the horn openings at the lower ends of the plurality of vertical water inlet branch pipes of the sewage uniform distribution treatment device, so that full contact between the sewage and the granular sludge is ensured.

In the present disclosure, in the sludge discharge stage, the light granular sludge and the heavy granular sludge in the system can be separated by dynamically adjusting the sludge discharge time.

According to the present disclosure, preferably, in the sedimentation stage of the process 1, process 2, and process 3, the sedimentation time is gradually shortened according to a calculated SVI index. As a preferred solution, in the sedimentation stage of the process 1, process 2, and process 3, the sedimentation time is gradually shortened according to a calculated SVI index. When the SVI value is decreased, the sedimentation time is shortened to screen out the sludge with a good sedimentation property.

In the present disclosure, the sludge discharge stage of the process 1 is conducted, on the one hand, to screen out the sludge with a good sedimentation property and the sludge with a poor sedimentation property, and on the other hand, to reduce the liquid level and provide certain space for the aeration process.

According to the present disclosure, preferably, in the aeration stage of the process 1, process 2, and process 3, the surface gas velocity in the system for enhanced culture of aerobic granular sludge is controlled at 0.1-1.5 cm/s.

In the present disclosure, in the aeration stage of the process 1, process 2, and process 3, the surface gas velocity in the system for enhanced culture of aerobic granular sludge is controlled at 0.1-1.5 cm/s by adjusting the frequency of the blower.

In the present disclosure, a feast-hunger strategy is specifically as follows. In a slow water intake process, the system is in an anaerobic stage, referred to as a feast stage, organic matter with rapid biological degradation in the sewage is converted into intracellular matter with slow biological degradation by the microorganisms, and phosphorus-accumulating bacteria conduct anaerobic phosphorus release in the stage. In the aeration stage, referred to as a hunger stage when pollutants in the sewage are degraded, the microorganisms grow by using the intracellular matter with slow biological degradation, and the phosphorus-accumulating bacteria conduct aerobic phosphorus uptake by using the intracellular matter in the stage.

Example 1

As shown in FIG. 3, in the example, a system for enhanced culture of aerobic granular sludge is provided. The system includes a reaction tank 5, a water inlet and outlet unit, an aeration unit, and a sludge discharge unit.

The water inlet and outlet unit includes a water inlet pump 2, a water inlet electric valve 3, a liquid flowmeter 4, a pressure flow sewage uniform distribution treatment device, buffers 10, a water drainage pipe 11, and a water drainage electric valve 12. The water inlet pump 2, the water inlet electric valve 3, the liquid flowmeter 4, and the sewage uniform distribution treatment device are connected in sequence. The sewage uniform distribution treatment device is arranged in the reaction tank 5, and used for realizing water intake and water drainage of the system. There are a plurality of buffers 10, and the plurality of buffers 10 are arranged at the bottom of the reaction tank 5, and used for buffering the water intake of the sewage uniform distribution treatment device.

The aeration unit includes a blower 18, microporous aerators 17, and a gas flowmeter 19. There are a plurality of microporous aerators 17, and the plurality of microporous aerators 17 are arranged at the bottom of the reaction tank 5, the blower 18 is connected to the plurality of microporous aerators 17 through a pipeline, and the gas flowmeter 19 is installed on the pipeline.

The sludge discharge unit includes sludge discharge pumps 13, a sludge discharge pipe 14, a sludge discharge electric valve 15, and a sludge concentration meter 16. There are a plurality of sludge discharge pumps 13, and the plurality of sludge discharge pumps 13 are arranged in the reaction tank 5, and connected to the sludge discharge pipe 14. The sludge discharge electric valve 15 and the sludge concentration meter 16 are arranged on the sludge discharge pipe 14.

The pressure flow sewage uniform distribution treatment device includes a water inlet device 6 and a water outlet device 8. The water inlet device 6 includes a water inlet main pipe, a water inlet inner channel, a water inlet weir, a water inlet outer channel, a plurality of vertical water inlet branch pipes 7, and a plurality of horn openings. The water outlet device 8 includes a water outlet main pipe, a water outlet channel, a water outlet weir, an outer flow baffle plate, and an inner flow baffle plate. Lower end openings of the plurality of vertical water inlet branch pipes 7 are connected to the plurality of horn openings. The water inlet device 6 is connected to the liquid flowmeter 4. The water outlet device 8 is connected to the water drainage pipe 11.

The pressure flow sewage uniform distribution treatment device is installed in the reaction tank 5 through a fixing support 9. The lower ends of the plurality of vertical horn openings are arranged close to the bottom of the reaction tank 5, and correspond to the plurality of buffers 10 one by one.

Example 2

In the example, a method for enhanced culture of aerobic granular sludge is provided. The method uses the system for enhanced culture of aerobic granular sludge provided in Example 1, and includes the following steps:
S1: subjecting sewage to grating treatment, aerated sand setting treatment, and treatment in a primary sedimentation tank in sequence; and
S2: inoculating seed sludge to the system, conveying effluent from the primary sedimentation tank to the system, and allowing periodic operation of the system, where the periodic operation includes a process 1 involving water intake (water drainage), stirring, sedimentation, sludge discharge, aeration, and standing: in the process 1, the water intake stage and the water drainage stage are carried out simultaneously; when water intake is conducted in a current period, effluent obtained after treatment in the last period is discharged; the water exchange ratio is 40%; and the upflow rate of the sewage in the system is controlled at 3 m/h. The system operates for 4 periods per day with 6 hours for each period.

In the example, the seed sludge is ordinary floc sludge obtained from a biological pool of a reclaimed water plant. The seed sludge has a loose structure, an average particle size of 70 μm, and a sludge concentration of 4,000 mg/L.

The sewage is effluent obtained from a primary sedimentation tank of the reclaimed water plant, and has a COD of 420 mg/L, an ammonia nitrogen content of 35 mg/L, a total nitrogen content of 46 mg/L, and a total phosphorus content of 7 mg/L.

The water intake (water drainage) is conducted for 90 minutes.

The stirring is conducted for 20 minutes.

The sedimentation is conducted for 30-90 minutes, specifically, is gradually shortened from 90 minutes to 30 minutes according to a calculated SVI index.

The sludge discharge is conducted for 4 minutes. In the sludge discharge stage of the process 1, the sludge discharge volume is not greater than 3% of a total volume of the sludge in the system.

The aeration is conducted for 150 minutes. In the aeration stage, the surface gas velocity in the system for enhanced culture of aerobic granular sludge is controlled at 0.3 cm/s.

In the standing stage of the process 1, sludge and water are separated, and the sludge is settled to form an obvious sludge bed. The standing time is obtained by subtracting the time for other processes from the period time.

Figure 1:
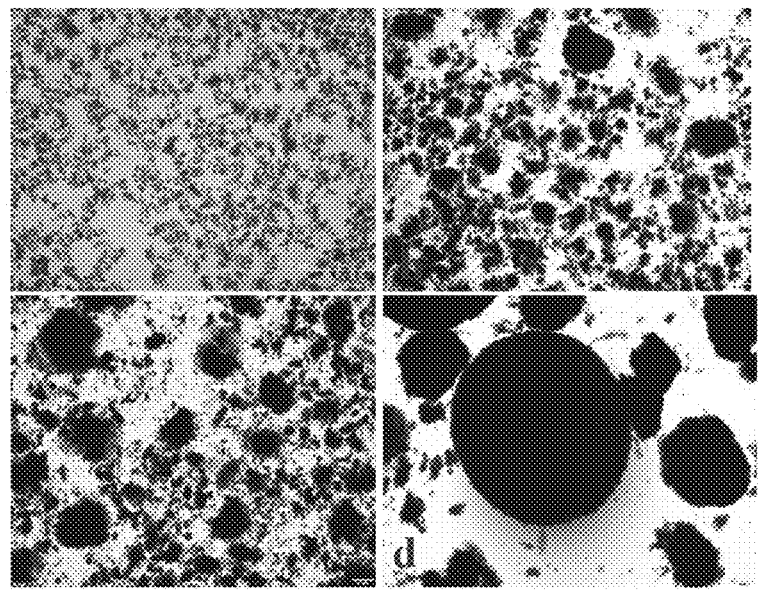
FIG. 1 is a microscope image of aerobic granular sludge cultured by using a method and system for enhanced culture of aerobic granular sludge provided in Example 2 of the present disclosure.

After the system operates for 15 days, the aerobic granular sludge can be preliminarily formed. As shown in FIG. 1, it can be seen that the newly formed aerobic granular sludge has an obvious kernel, a branched outside structure, and an unsmooth surface. With continuous operation of the system, the particle gradually becomes mature. At this time, the particles are in a circular or oval shape, and have a round and smooth surface. The preliminarily formed aerobic granular sludge has an average particle size of 1,000 μm, and a proportion of 95% in the system.

Example 3

In the example, a method for enhanced culture of aerobic granular sludge is provided. The method uses the system for enhanced culture of aerobic granular sludge provided in Example 1, and includes the following steps:
S1: subjecting sewage to grating treatment, aerated sand setting treatment, and treatment in a primary sedimentation tank in sequence; and
S2: inoculating seed sludge to the system, conveying effluent from the primary sedimentation tank to the system, and allowing periodic operation of the system, where the periodic operation includes a process 1 involving water intake (water drainage), stirring, sedimentation, sludge discharge, aeration, and standing; in the process 1, the water intake stage and the water drainage stage are carried out simultaneously; when water intake is conducted in a current period, reclaimed water obtained after treatment in the last period is discharged; the water exchange ratio is 50%; and the upflow rate of the sewage in the system is controlled at 2 m/h. The system operates for 4 periods per day with 6 hours for each period.

In the example, the seed sludge is sludge cake obtained after residual sludge is treated in a reclaimed water plant, and has an average particle size of 70 μm, and a sludge concentration of 5,000 mg/L.

The sewage is effluent obtained from a primary sedimentation tank of the reclaimed water plant, and has a COD of 500 mg/L, an ammonia nitrogen content of 48 mg/L, a total nitrogen content of 60 mg/L, and a total phosphorus content of 6 mg/L.

The water intake and the water drainage are both conducted for 120 minutes.

The stirring is conducted for 20 minutes.

The sedimentation is conducted for 15-40 minutes, specifically, is gradually shortened from 40 minutes to 15 minutes according to a calculated SVI index.

The sludge discharge is conducted for 3 minutes. In the sludge discharge stage of the process 1, the sludge discharge volume is not greater than 3% of a total volume of the sludge in the system.

The aeration is conducted for 150 minutes. In the aeration stage, the surface gas velocity in the system for enhanced culture of aerobic granular sludge is controlled at 0.3 cm/s.

In the standing stage of the process 1, sludge and water are separated, and the sludge is settled to form an obvious sludge bed. The standing time is obtained by subtracting the time for other processes from the period time.

Figure 2:
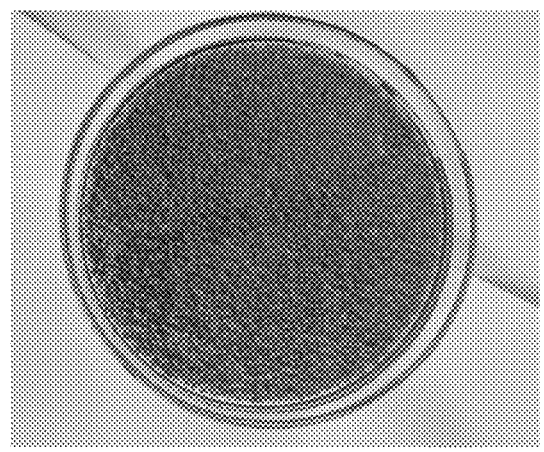
FIG. 2 is a schematic diagram of aerobic granular sludge successfully cultured by using a method and system for enhanced culture of aerobic granular sludge provided in Example 3 of the present disclosure.

After the system operates for 15 days, the aerobic granular sludge is successfully cultured. As shown in FIG. 2, the successfully cultured mature aerobic granular sludge is in a regular shape, and has a round surface, an average particle size of 500 μm, and a proportion of 80%.

Example 4

In the example, a method for enhanced culture of aerobic granular sludge is provided. The method uses the system for enhanced culture of aerobic granular sludge provided in Example 1, and includes the following steps:

S1: subjecting sewage to grating treatment, aerated sand setting treatment, and treatment in a primary sedimentation tank in sequence; and S2: inoculating seed sludge to the system, conveying effluent from the primary sedimentation tank to the system, and allowing periodic operation of the system, where the periodic operation includes a process 2 involving water intake, aeration, sedimentation, and water drainage. In the process 2, the water intake stage and the water drainage stage are carried out separately. The system operates for 4 periods per day with 6 hours for each period.

In the example, the seed sludge is ordinary floc sludge obtained from a biological pool of a reclaimed water plant. The seed sludge has a loose structure, an average particle size of 40 μm, and a sludge concentration of 4,000 mg/L.

The sewage is effluent obtained from a primary sedimentation tank of the reclaimed water plant, and has a COD of 600 mg/L, an ammonia nitrogen content of 60 mg/L, a total nitrogen content of 65 mg/L, and a total phosphorus content of 10 mg/L.

The water intake is conducted for 60 minutes. The water drainage is conducted for 30 minutes. The water exchange ratio is 40%. The aeration is conducted for 140 minutes. In the aeration stage, the surface gas velocity in the system for enhanced culture of aerobic granular sludge is controlled at 0.4 cm/s.

The sedimentation is conducted for 20-120 minutes, and is gradually shortened from 120 minutes to 20 minutes according to a calculated SVI index.

After the system operates for 30 days, the aerobic granular sludge in the system is in a regular shape, and has an average particle size of 600 μm and a proportion of 90%.

The various embodiments of the present disclosure have been described above. The above descriptions are exemplary, rather than exhaustive, and the present disclosure is not limited to the embodiments disclosed. Various modifications and changes are apparent to persons of ordinary skill in the art without departing from the scope and spirit of the embodiments described.

The invention claimed is:

1. A system for enhanced culture of aerobic granular sludge, comprising a reaction tank, a water inlet and outlet unit, an aeration unit, and a sludge discharge unit, wherein
    the water inlet and outlet unit comprises a water inlet pump, a water inlet electric valve, a liquid flowmeter, a sewage uniform distribution treatment device, a plurality of buffers, a water drainage pipe, and a water drainage electric valve; the water inlet pump, the water inlet electric valve, the liquid flowmeter, and the sewage uniform distribution treatment device are connected in sequence; the sewage uniform distribution treatment device is arranged in the reaction tank, and the sewage uniform distribution treatment device is configured for water intake and water drainage of the system; the plurality of buffers are arranged at the bottom of the reaction tank, and the plurality of buffers are configured to buffer the water intake of the sewage uniform distribution treatment device;
    the aeration unit comprises a blower, a plurality of microporous aerators, and a gas flowmeter; the plurality of microporous aerators are arranged at the bottom of the reaction tank, the blower is connected to the plurality of microporous aerators through a pipeline, and the gas flowmeter is installed on the pipeline; and
    the sludge discharge unit comprises a plurality of sludge discharge pumps, a sludge discharge pipe, a sludge discharge electric valve, and a sludge concentration meter; the plurality of sludge discharge pumps are arranged in the reaction tank, and connected to the sludge discharge pipe; and the sludge discharge electric valve and the sludge concentration meter are arranged on the sludge discharge pipe.

2. The system for enhanced culture of aerobic granular sludge according to claim 1, wherein
    the sewage uniform distribution treatment device is installed in the reaction tank through a fixing support; horn openings connected to lower ends of a plurality of vertical water inlet branch pipes of the sewage uniform distribution treatment device are arranged close to the bottom of the reaction tank, and correspond respectively to the plurality of buffers;

the sewage uniform distribution treatment device is a pressure flow sewage uniform distribution treatment device or a gravity flow sewage uniform distribution treatment device.

3. A method for enhanced culture of aerobic granular sludge, wherein the method uses the system according to claim 1, and comprises the following steps:
   S1: subjecting sewage to grating treatment, aerated sand setting treatment, and treatment in a primary sedimentation tank in sequence; and
   S2: inoculating seed sludge to the system, conveying effluent from the primary sedimentation tank to the system, and allowing periodic operation of the system, wherein the periodic operation comprises a process 1 involving water intake, water drainage, stirring, sedimentation, sludge discharge, aeration, and standing, a process 2 involving water intake, aeration, sedimentation, and water drainage, or a process 3 involving water intake, stirring, aeration, sedimentation, and water drainage;
   in the process 1, the water intake stage and the water drainage stage are carried out simultaneously;
   in the process 2, the water intake stage and the water drainage stage are carried out separately;
   in the process 3, the water intake stage and the stirring stage are carried out simultaneously or separately, and the water intake stage and the water drainage stage are carried out separately.

4. The method for enhanced culture of aerobic granular sludge according to claim 3, wherein the seed sludge is ordinary floc sludge or sludge cake, and has an average particle size of 40-100 μm and a sludge concentration of 2,000-8,000 mg/L.

5. The method for enhanced culture of aerobic granular sludge according to claim 3, wherein the sewage has a COD of 100-2,000 mg/L, an ammonia nitrogen content of 20-200 mg/L, a total nitrogen content of 20-200 mg/L, and a total phosphorus content of 1-20 mg/L.

6. The method for enhanced culture of aerobic granular sludge according to claim 3, wherein
   in the process 1, the water intake and the water drainage are both conducted for 30-120 minutes, the stirring is conducted for 10-90 minutes, the sedimentation is conducted for 10-120 minutes, the sludge discharge is conducted for 3-30 minutes, and the aeration is conducted for 60-360 minutes;
   in the process 2, the water intake is conducted for 30-120 minutes, the aeration is conducted for 60-360 minutes, the sedimentation is conducted for 20-200 minutes, and the water drainage is conducted for 10-40 minutes; and
   in the process 3, the water intake is conducted for 30-120 minutes, the stirring is conducted for 30-60 minutes, the aeration is conducted for 30-360 minutes, the sedimentation is conducted for 20-140 minutes, and the water drainage is conducted for 10-40 minutes.

7. The method for enhanced culture of aerobic granular sludge according to claim 3, wherein in the process 1, process 2, and process 3, the water exchange ratio is 20%-70%.

8. The method for enhanced culture of aerobic granular sludge according to claim 3, wherein in the process 1, a method for carrying out the water intake stage and the water drainage stage simultaneously is as follows: when water intake is conducted in a first period, effluent from a preceding period is discharged.

9. The method for enhanced culture of aerobic granular sludge according to claim 3, wherein in the sedimentation stage of the process 1, process 2, and process 3, the sedimentation time is gradually shortened according to a calculated SVI index.

10. The method for enhanced culture of aerobic granular sludge according to claim 3, wherein in the aeration stage of the process 1, process 2, and process 3, the surface gas velocity in the system for enhanced culture of aerobic granular sludge is controlled at 0.1-1.5 cm/s.

* * * * *